June 13, 1967  R. P. OGDEN  3,325,625
APPARATUS FOR WELDING STIFFENERS TO FABRICATED I-BEAMS
Filed Nov. 14, 1963  5 Sheets-Sheet 2
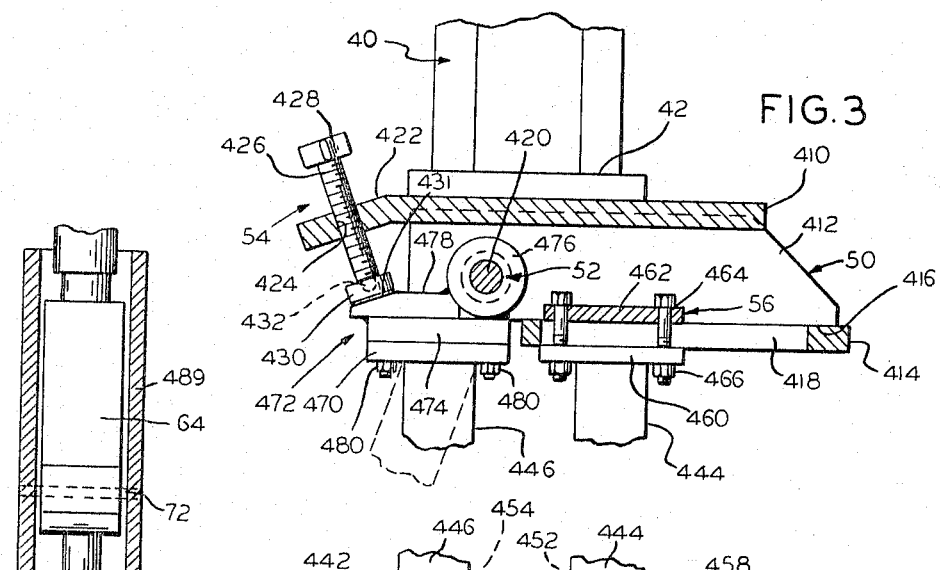
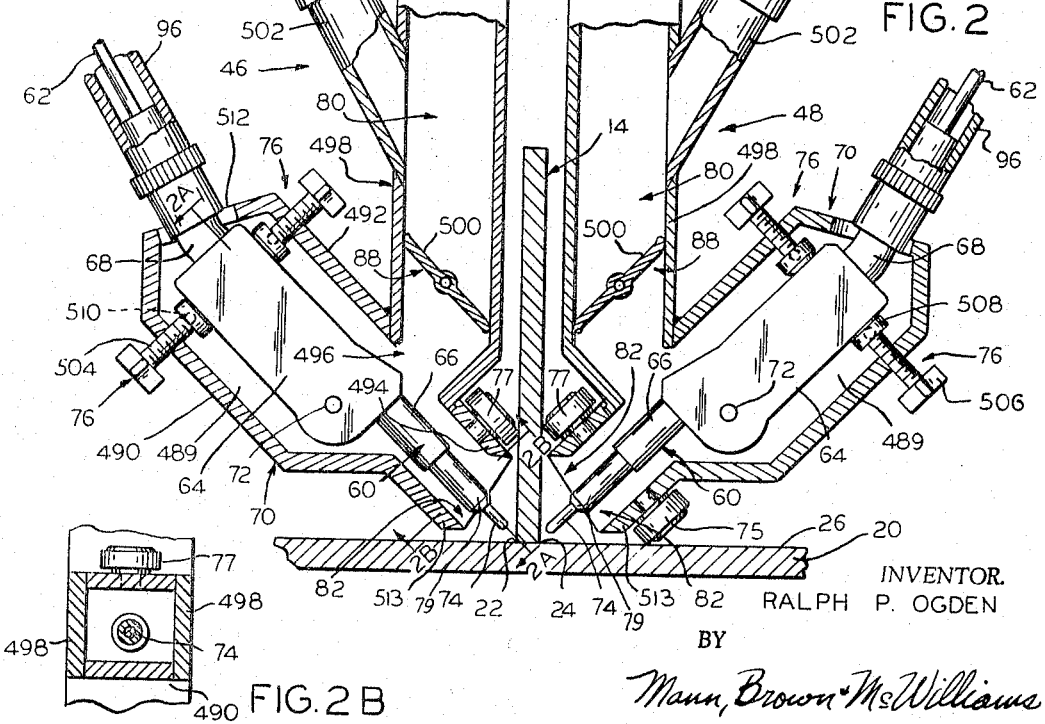
INVENTOR.
RALPH P. OGDEN
BY
Mann, Brown & McWilliams
ATTORNEYS

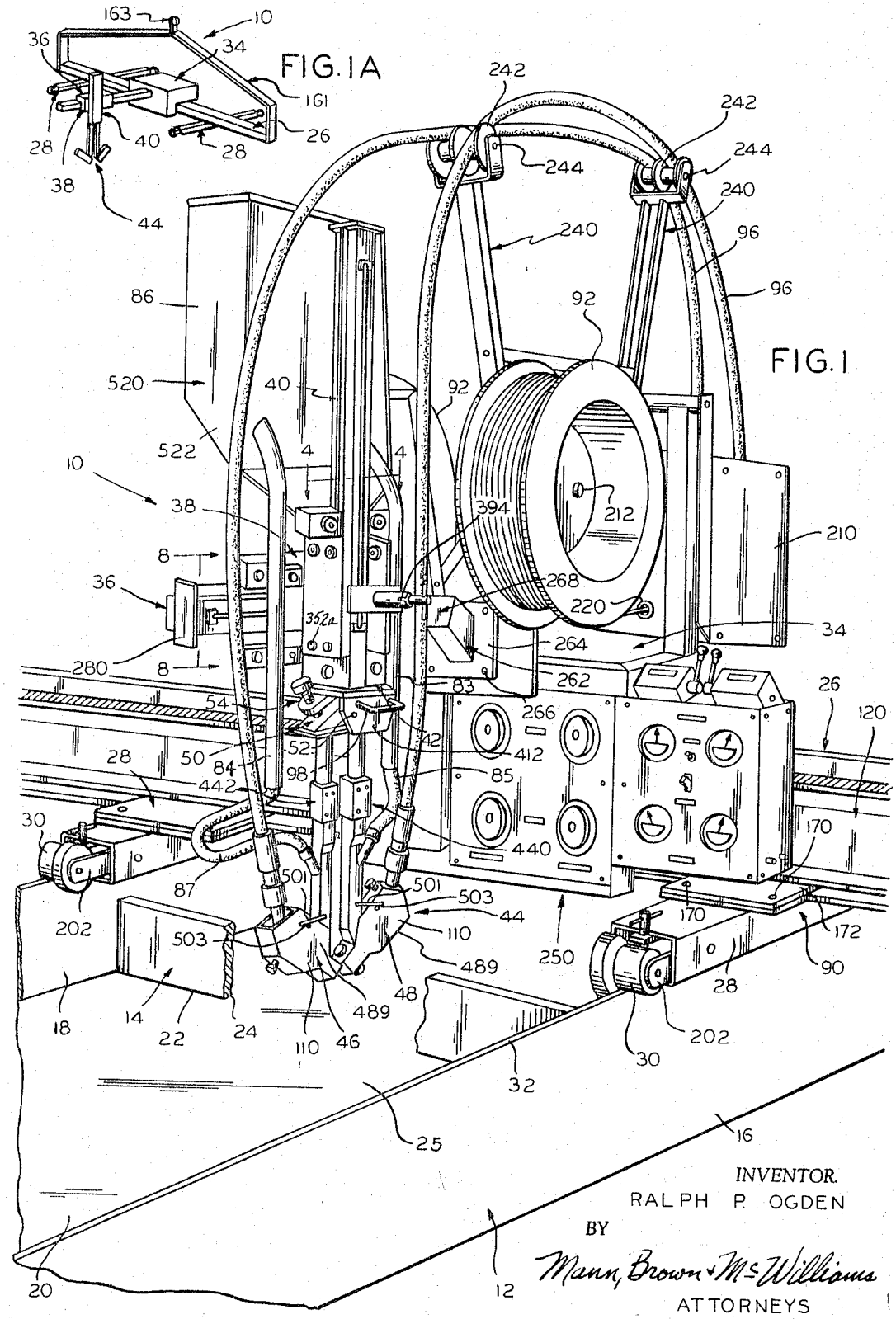

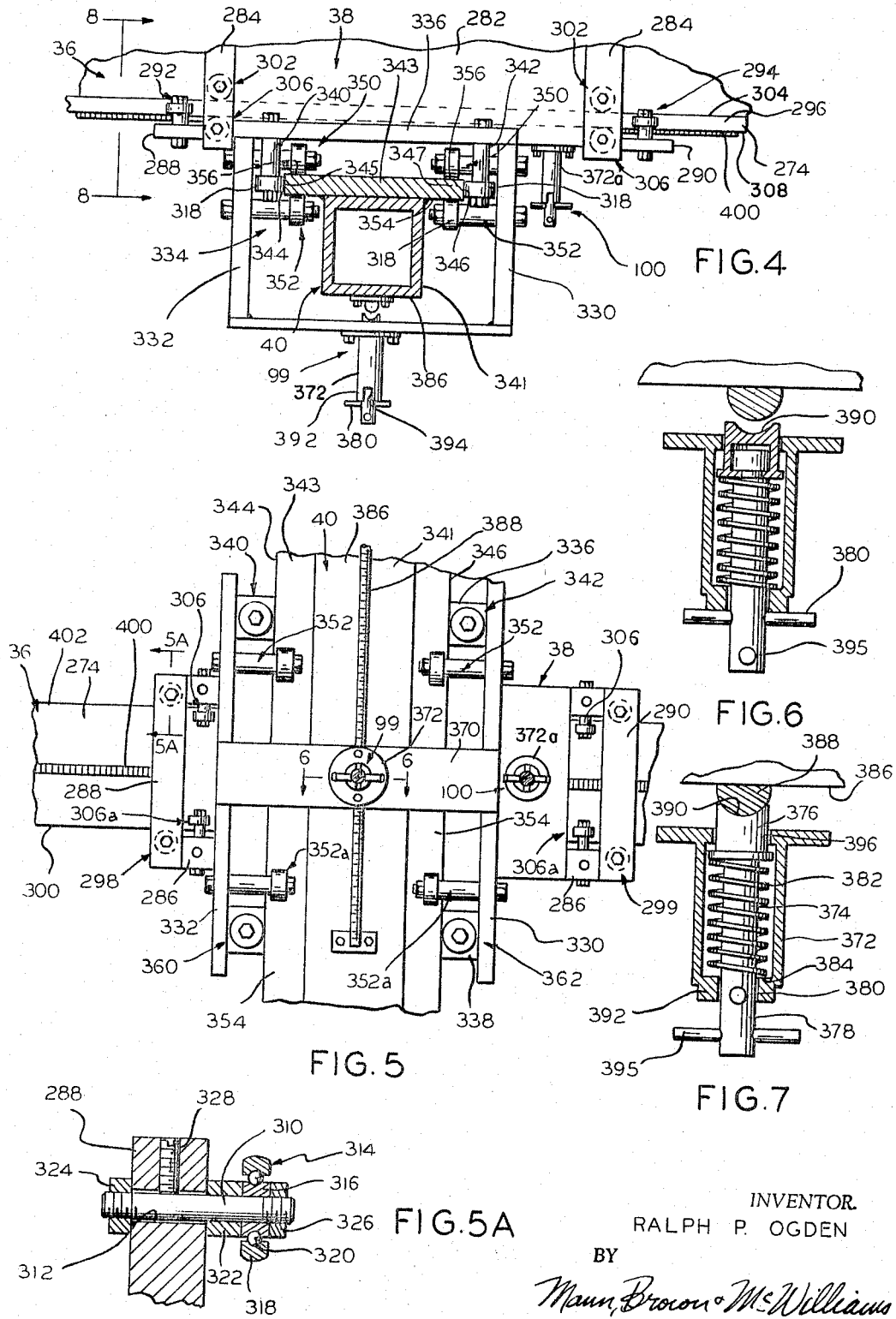

June 13, 1967  R. P. OGDEN  3,325,625
APPARATUS FOR WELDING STIFFENERS TO FABRICATED I-BEAMS
Filed Nov. 14, 1963  5 Sheets-Sheet 4
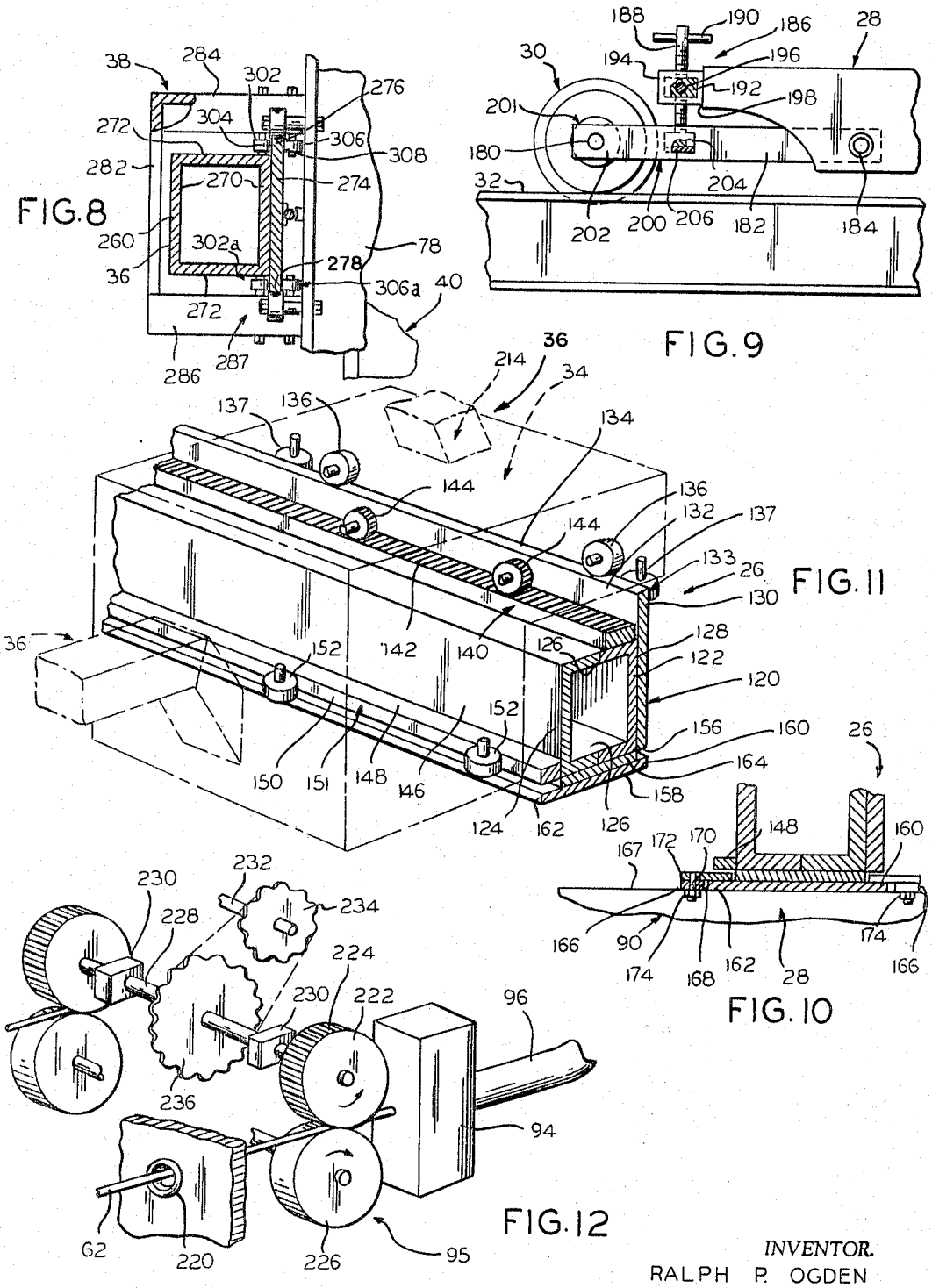
INVENTOR.
RALPH P. OGDEN
BY
Mann, Brown & McWilliams
ATTORNEYS

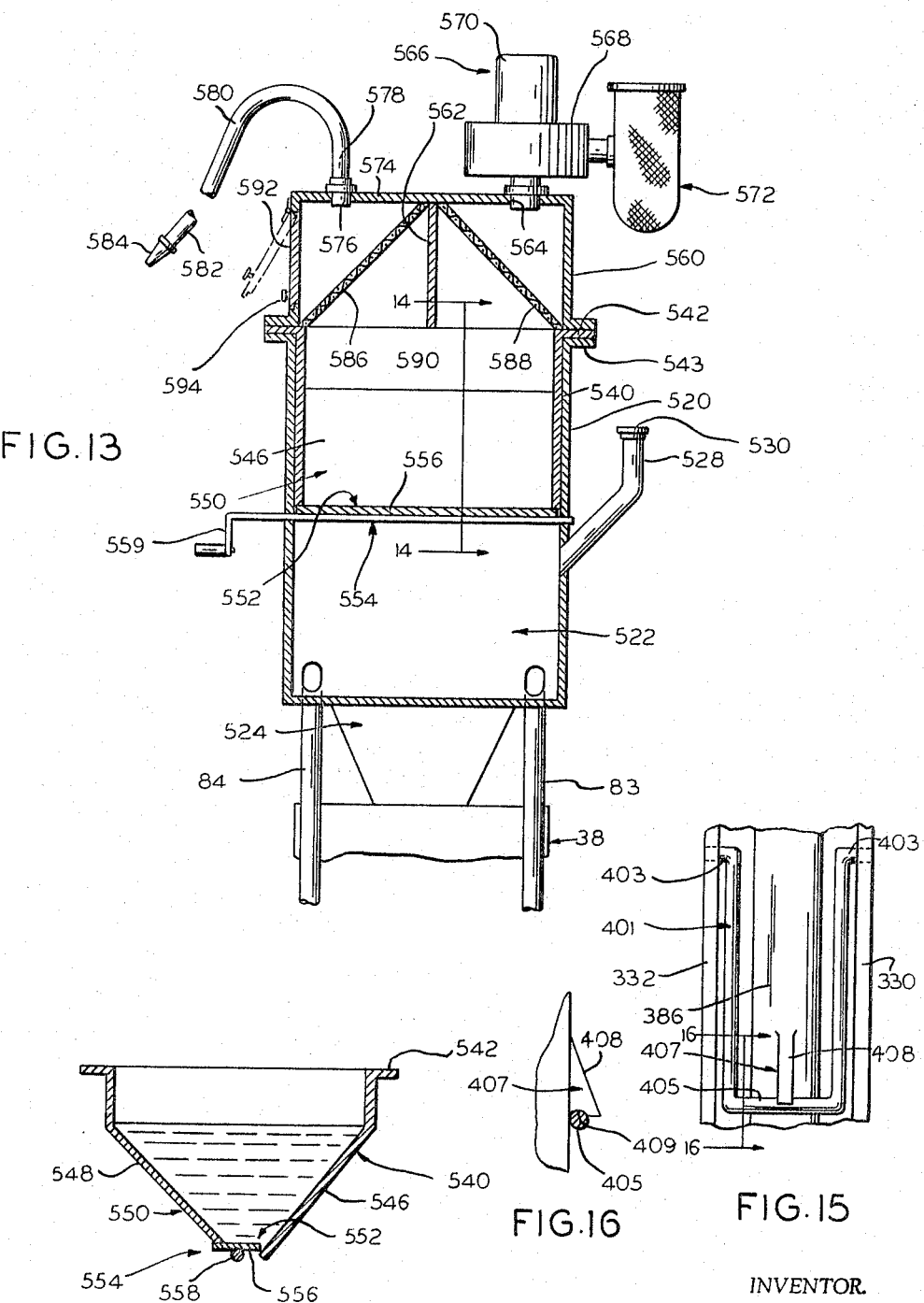

3,325,625
APPARATUS FOR WELDING STIFFENERS TO FABRICATED I-BEAMS
Ralph P. Ogden and William P. Lawson, Hammond, Ind., assignors to Ogden Engineering Corporation, a corporation of Indiana
Filed Nov. 14, 1963, Ser. No. 323,820
18 Claims. (Cl. 219—125)

Our invention relates to apparatus and devices for welding stiffeners to fabricated I-beams, and more particularly, to dual welding head or torch arrangements for simultaneously fillet welding both sides of the stiffener to the beam web.

Fabricated I-beams of a size appropriate for use as girders in the construction of bridges ordinarily require the application thereto of stiffener or reinforcing plates on both sides of the beam and between its end flanges.

These stiffener plates (or stiffeners as they are known in the art) are customarily weld to the web and extend between the end flanges of the beam, which end flanges may be spaced apart as much as 96 or more inches, depending upon the stress the beam is designed to withstand.

The welding of the stiffeners customarily is performed after the fabrication of the I-beams has been substantially completed and the beams positioned to rest on their end flanges, so that ready access may be had to the beam web, which is then horizontally disposed. After the stiffeners have been applied as desired to one side of the beam, the beam is turned over and the operation repeated to apply the stiffeners to the other beam side.

Heretofore the stiffener plates have been fillet welded in place by using manually operated welding equipment, or at the best, semi-automatic welding equipment. In both types of equipment, the operator must follow the joint manually, and, as the type of weld involved in connection with the application of stiffeners to fabricated I-beams is uncomfortable to make, work output tends to be quite limited.

However, it has not yet proved feasible to weld the stiffener plates with automatic equipment because the welding heads or torches must follow the contours of the stiffener and the beam web (which usually are not straight), and the fillet weld must go as close to the end flanges as possible. Furthermore, control of the flux application as to height is required if undue flux waste is to be avoided.

Moreover, the providing of equipment that would satisfy all these requirements would additionally encounter the problem of fitting all the necessary equipment into permissible space requirements.

Automatic welding equipment available prior to our invention has not yet satisfied these requirements, and consequently the application of stiffeners to fabricated I-beams has continued to be done on manual basis, until the development of our invention.

A principal object of our invention is to provide apparatus for fillet welding stiffeners to fabricated beams that puts the actual welding involved on a substantially automatic basis.

Another principal object of our invention is to provide a horizontally and vertically floating dual welding head or torch arrangement for simultaneously and automatically welding both sides of the stiffener to the beam.

Still another principal object of our invention is to provide apparatus for welding stiffeners to fabricated I-beams that is adjustable to accommodate varying stiffener thicknesses as well as beam thicknesses.

Yet another principal object of the invention is to provide a flux recovery system for apparatus such as the type under consideration that not only avoids waste of flux, but also returns the flux to the hopper that supplies the flux to the welding heads.

Other objects of the invention are to provide a novel welding head arrangement providing for adjustment of the welding wire with respect to the head, and which permits the welding head to position the welding wire closely adjacent the beam end flange so that the fillet weld involved extends as closely as possible to the beam end flange, to provide a novel drive arrangement for feeding welding wires or electrodes to our dual head welding device, and to provide apparatus of the type described that is economical of manufacture, convenient to use, and susceptible of wide utility in the welding field.

Still other objects, uses and advantages will become obvious or be apparent from a consideration of the following detailed description and the application drawings.

In the drawings:

FIGURE 1 is a diagrammatic perspective view illustrating a specific embodiment of our invention applied to a fabricated I-beam in accordance with our invention to fillet weld stiffeners to the beam web, with the dual welding head arrangement thereof being shown in a partially lowered position and in its retracted position with respect to the machine bridge;

FIGURE 1A is a small scale diagram of our machine showing the principal parts thereof;

FIGURE 2 is an enlarged fragmental side elevational view of the dual welding head arrangement forming a part of the apparatus shown in FIGURE 1, with parts being shown in section and other parts being broken away;

FIGURES 2A and 2B are sectional views along lines 2A—2A and 2B—2B, respectively, of FIGURE 2;

FIGURE 3 is a fragmental diagrammatic elevational view illustrating the connection we employ between the welding heads of the apparatus of FIGURE 1, and a novel floating vertical beam that forms a part of said apparatus;

FIGURE 4 is a fragmental plan view substantially along line 4—4 of FIGURE 1, looking in the direction of the arrows, and further illustrating details of the novel floating beam;

FIGURE 5 is a fragmental, side elevational view of the structure shown in FIGURE 4, illustrating in particular the manner in which the floating beam is secured to the machine of FIGURE 1;

FIGURE 5A is a detailed fragmental cross-sectional view substantially along line 5A—5A of FIGURE 5, and illustrating the structural features of one of the roller devices employed in connection with the mounting arrangement for the floating beam of the machine of FIGURE 1;

FIGURE 6 is a detailed fragmental cross-sectional view substantially along line 6—6 of FIGURE 5 illustrating a device for locking the floating beam at a desired position of elevation above the fabricated I-beam web, as when the welding machine is being moved longitudinally of the I-beam for positioning over a stiffener, and showing the device in its unlocking position;

FIGURE 7 is similar to that of FIGURE 6, but showing the latch device in its locking position;

FIGURE 8 is a view substantially along line 8—8 of FIGURES 1 and 4, looking in the direction of the arrows, and further illustrating the connection of the floating beam to the machine of FIGURE 1;

FIGURE 9 is a fragmental diagrammatic side elevational view of one of the ends of one of the trucks of the machine shown in FIGURE 1, illustrating the manner in which the truck wheels are made adjustable to the level of the machine where this is necessary because of differences in end flange height;

FIGURE 10 is an enlarged fragmental view illustrating the manner in which the machine trucks are adjustably secured to the machine bridge to permit adjustment to accommodate fabricated I-beams of varying depths;

FIGURE 11 diagrammatically illustrates a suitable arrangement whereby the floating beam component of our machine, and hence the dual welding heads, may be automatically moved longitudinally of the stiffener;

FIGURE 12 diagrammatically illustrates an arrangement for feeding the welding wires to the welding heads of our machine;

FIGURE 13 is a diagrammatic sectional view through the flux hopper of the machine shown in FIGURE 1, illustrating the specifics of a novel flux recovery system forming a part of our invention;

FIGURE 14 is a view substantially along line 14—14 of FIGURE 13;

FIGURE 15 is a fragmental side elevational view of the floating upright beam welding head support of our invention, illustrating a modified arrangement for supporting same in its raised position; and FIGURE 16 is a fragmental cross-sectional view along line 16—16 of FIGURE 15.

However, it is to be distinctly understood that the specific drawing illustrations provided are supplied primarily for purposes of complying with the requirements of 35 U.S.C. 112, and that the invention may take other embodiments that will be obvious to those skilled in the art. It is therefore clear that the appended claims are to be construed as broadly as the relevant prior art will permit.

*General description*

Reference numeral 10 of FIGURE 1 generally indicates a successful embodiment of our invention applied to a prefabricated I-beam 12 for the purpose of welding a stiffener 14 thereto.

The I-beam 12 generally comprises a pair of elongated plates 16 and 18 welded to a plate 20 to define the usual I-beam configuration whereby the plates 18 and 16 form the end flanges of the I-beam and the plate 20 forms its web.

As already indicated, fabricated I-beams 12 of the type that are to be used for bridge girders and the like ordinarily require the application thereto of stiffeners 14 between the end flanges 18 and 16, and which are welded to the web 20. It has long been the practice in applying the stiffeners 14 to the beams 12 to place the beams 12 so that their end flanges 16 and 18 are disposed vertically, thereby disposing the web 20 in a horizontal position so that the stiffeners 14 may be conveniently placed on top of the web between the flanges 16 and 18 and welded in place along fillets 22 and 24 that are defined where the stiffener is placed against the upwardly facing surface 25 of the web 20.

As already explained, one reason that this particular welding task has continued to remain on a manual basis is that the fillets 22 and 24 must be carefully followed during the welding process in order to securely weld the stiffener to the web. As the web 20 and the stiffener 14 usually are not straight, the fillets 22 and 24 may vary vertically and horizontally accordingly.

Furthermore, when the stiffeners 14 are initially put in place, as by tack welding, they frequently are not exactly square with the flanges 16 and 18, which means that the fillets 22 and 24 may extend at an angle with respect to the flanges 16 and 18 that is slightly under or over 90 degrees.

Furthermore, the fillet welds at fillets 22 and 24, to meet acceptable welding standards, must reach as closely as possible to the flanges 16 and 18.

Machine 10 comprising a preferred arrangement of one embodiment of our invention meets all these requirements and for the first time makes practical the automatic fillet welding of stiffeners 14 to prefabricated beams 12.

The machine 10 comprises a bridge 26 mounted on trucks 28 having wheels 30 at each end thereof which ride on the upwardly facing edges 32 of the beam end flanges 16 and 18 when the beam 12 is turned on its side following the usual procedure for stiffener application.

Mounted on the bridge 26 for movement longitudinally of the bridge and laterally of the beam 12 is a trolley 34 having fixed thereto a cantilever support member 36 on which is mounted a carriage 38 that is mounted for free floating movement longitudinally of the support member 36. The support member 36 extends perpendicular to the bridge 26, and thus when machine 10 is applied to a beam 12 in the manner indicated in FIGURE 1, the support member 36 lies in a vertical plane that extends longitudinally of the beam 12.

The carriage 38, which is more fully illustrated in FIGURES 4, 5 and 8, has connected thereto for free floating movement vertically thereof an elongated upright member or beam 40, which has secured to its lower end portion 42 (see FIGURES 1 and 3) the dual welding head arrangement or unit 44, that comprises a pair of novel narrow, planar, or flat, welding heads or torches 46 and 48.

As indicated in FIGURES 1 and 3, the planar heads 46 and 48 are connected to the lower end of the beam 40 by a fabricated connector structure 50, which includes a pivotal connection for the torch 46 to the connector structure 50 as at 52 and a screw clamp device 54 for swinging the torch 46 about its pivotal connection 52 into engagement with the stiffener. The torch 48 may be moved toward or away from the pivotal connection 52 by appropriately operating the connector device 56 (see FIGURE 3) that connects it to the connecting structure 50.

As indicated in FIGURE 2, the welding heads or torches 46 and 48 each further comprise a welding wire or electrode nozzle 60 through which welding wires 62 are fed for application to the fillets 22 and 24. In accordance with our invention, the nozzles 60 are embedded in bodies 64 formed from an electrically insulating material (preferably an insulating epoxy resin), with the ends 66 and 68 of the nozzle extending outwardly of the respective bodies 64, and the bodies 64 are mounted within narrow and flat or planar housings 70 to pivot relative to the housings about axes 72, whereby the welding wire tips 74 may be adjusted with respect to the fillets 22 and 24 for any particular stiffener application. Ends 66 include nozzle tips 79 from which wire tips 74 protrude.

The bodies 64 in the illustrated embodiment may be adjusted about their pivotal axes 72 by employing screw devices 76.

The housings 70 are formed to define a flux receiving chamber 80 which communicates with a flux discharge opening 82 defined by the housings, and in which the welding wire tips 74 are disposed. Appropriate conduits 83 and 84 (including flexible portions 85 and 87, respectively) connect the respective flux receiving chambers 80 with hopper 86 that is secured in any suitable way to the carriage 38. The hopper 86 is arranged in the manner indicated in FIGURES 13 and 14 to supply flux to the torches 46 and 48 by gravity flow, which flow may be controlled by appropriate valve devices 88 (see FIGURE 2) associated with the respective welding torches, or in any other suitable manner.

The housing of head 48 includes a roller 75 that engages the beam web to support the welding head arrangement 44 for movement on the web, and both housings 70 include a roller 77 positioned to engage the stiffener in the operating position of the head arrangement 44. It will be noted that rollers 75 and 77 are rotatable about axes lying in the plane of heads 46 and 48 and that are disposed substantially normally of the respective welding wire feed paths of said heads; the structural relation indicated places guiding rollers 75 and 77 both close to the weld joint and in alignment with the welding arcs, while at the same time the angled corners of the cylindrically based rollers 75 and 77 make for firm contact with the beam web and stiffener.

The machine 10 includes an appropriate drive mechanism for moving the trolley 34 with respect to the bridge 26, and an arrangement for feeding the welding wires to the dual welding heads. Examples of suitable mechanisms for achieving these purposes are shown in FIGURES 11 and 12, respectively.

Further in accordance with our invention, the bridge 26 is releasably secured to the respective trucks 28 by releasable clamping devices 90 so that the trucks 28 can be selectively shifted longitudinally of the bridge to accommodate beams 12 of different depths.

The welding wires are carried on the trolley 34 by being applied to a pair of reels 92, and the dual welding wire feed arrangement shown in FIGURE 12 draws the welding wires off the respective reels and feeds them through identical electrical contacts 94 (only one is shown for simplicity of illustration) and into the respective insulating conduits 96 through which they pass to the respective welding heads or torches. A suitable source of welding current is made available in a conventional manner to the contacts 94, and the wiring of the machine 10 is preferably such that when the machine welding circuit is turned on, the welding wires are simultaneously energized and actuated for fillet welding application to fillets 22 and 24.

When the machine 10 is initially mounted on the beam 12, the heads or torches 46 and 48 should be positioned above the level of the stiffeners, and for this purpose handle 98 is applied to the floating beam 40 to enable the operator to so position the torches, after which the beam may be locked in this position by actuating the clamp lock device 99 shown in FIGURES 4–7. A similar clamp lock device 100 is carried by the carriage 38 to lock the carriage against movement longitudinally of the support member 36.

In use, the machine 10 is applied to a beam 12 in substantially the manner indicated in FIGURE 1, with the rollers 30 of trucks 28 riding on the upwardly facing edges 32 of the end flanges 16 and 18 after the beam has been turned over on its side.

The stiffeners 14 are then spaced along the length of the beam 12 in the usual manner, and may be tack welded in their desired position of installation.

The machine 10 is then moved longitudinally of the beam 12, as by the operator grasping the bridge 26 and moving it longitudinally of the beam, to position the torches 46 and 48 adjacent the stiffener.

The operator then operates screw devices 54 (see FIGURE 3) to move it away or space it from head 46, and then he grasps head or torch 46 (which is then free to move) and swings it away from torch 48; after unlocking the latching devices 99 and 100, he lowers the floating beam 40 to dispose the stiffener between the torches 46 and 48 and rest the heads or torches, as well as beam 40, on roller 75 of head 48.

The screw clamp device 54 is then operated to bring it into engagement with the torch 46 to swing torch 46 towards the torch 48 as required to bring the roller 77 of head or torch 46 into engagement with the stiffener 14 and also draw the roller 77 of the torch or head 48 against the opposing side of the stiffener 14.

When this is completed, the operator should be sure that the welding wire tips 74 are correctly directed into the fillets 22 and 24. As the vertical and horizontal legs of the fillet weld must be substantially equal, the tips 74 of the welding wires must be disposed at a 45 degree angle with respect to the stiffener and web, and thus bisect the angle between the stiffener and web. In accordance with our invention, this is achieved by employing the screw devices 76 to pivot bodies 64 about their pivotal axes 72 as necessary to achieve the desired positioning of the welding wire tips, which is substantially as shown in FIGURE 2.

It is then merely necessary to position the welding head housings in abutting relation with one of the end flanges 16 or 18, and turn on the welding machine to start the welding operation as well as motion of the trolley 34 with respect to the bridge toward the other end flange. As the welding proceeds, the torches 46 and 48 simultaneously apply a fillet weld along the respective fillets 22 and 24, while at the same time the torches 46 and 48 are permitted to shift horizontally and vertically in planes normal to the stiffener by the nature of the connections between the floating beam 40, the carriage 38, and the support member 36.

As indicated in FIGURE 1, the torches 46 and 48 are quite flat and thin in transverse configuration and preferably the proportioning of parts is such that when a side surface 110 of a welding head housing 70 is positioned in abutting relation with an end flange 16 or 18, the tip of the welding rod 74 is disposed no more than an inch from the said end flange. All parts of the heads that are to be disposed below flange end surfaces 32 in the operative position of head arrangement 44 should have a thickness no greater than that of the head housings 70, and the side surface 110 shown in FIGURE 1 for each head is present on the reverse side of each head.

When the welding operation is completed, the welding machine is turned off and the operator operates the screw clamp device 54 to permit the torch 46 to be swung away from the stiffener, and then he uses handle 98 to lift the torch arrangement 44 above the level of the stiffeners, after which it is locked in that position by employing the latch device 99, for movement to a new location.

It will therefore be seen that we have provided a machine that renders the welding of stiffeners to prefabricated I-beams substantially automatic, and yet insures the uniform welding results that are essential in view of the use to which such beams are put. Furthermore, this is achieved while insuring a fillet weld that extends to an acceptable limit towards the end flange, while still meeting the space requirements imposed upon apparatus of the type under consideration.

*Specific description*

The specific details of bridge 26 are diagrammatically illustrated in FIGURE 11, wherein it will be seen that the bridge 26 comprises a fabricated beam 120 including a pair of channels 122 and 124 fixed together as by welding at 126. Applied to one side 128 of the beam or girder 120 is a vertically disposed plate 130 (secured in place on the beam or girder 120 as by plug welding) which is proportioned to define upwardly projecting edge portion 132 that forms an upwardly facing trackway 134 for a pair of rollers 136 that are journalled in the trolley 34 in any suitable manner (the trolley 34 being only diagrammatically illustrated and shown in phantom in FIGURE 11). Edge portion 132 of plate 130 also forms a vertically disposed trackway 133 for rollers 137 that are likewise journalled in trolley 34 in any suitable manner.

Applied to the top of the beam or girder 120 is a rack member 140 presenting upwardly facing rack teeth 142 which are engaged by one or more spur gears 144 operatively journalled in a trolley and powered by any suitable drive arrangement to move the trolley longitudinally of the bridge 26 when the welding operation is to be performed on the stiffeners.

Affixed to the side 146 of the beam or girder 120 is a bar 148 presenting a vertically disposed face 150 forming a vertical trackway 151 for a pair of rollers 152 journalled in any appropriate manner in the trolley 34. The rollers 152 and the trackway 151 serve to brace the trolley against the weight of the dual welding head assembly 44 and other components of the apparatus 10 that are supported by the support member 36.

Fixed to the underside 156 of the beam or girder 120 is an abutment plate 158 proportioned to define outwardly extending edges 160 and 162. Interposed between the plate 158 and the bottom 156 of beam 120 is a spacer plate 164, the purpose of which in the embodiment illustrated is to separate the plate 160 from the plate 130 and the bar 148 to permit the clamp locking devices 90 to be applied to the respective edge portions 160 and 162 of the plate 158 for purposes of locking the bridge 26 in place with respect to the trucks (see FIGURES 1 and 10).

As indicated in FIGURE 1A, bail structure 161 is fixed between the ends of the bridge and includes eye structure 163 for crane lifting of machine 10 between I-beams.

As indicated in FIGURE 10, the clamp lock devices 90 of each truck comprise a pair of spaced plates or bars 166 fixed as by welding to the top surface 167 of the truck. Each of the bars 166 at either end thereof is provided with an opening 168 to receive a threaded stud 170 fixed to either end of the clamping plate 172 and that is proportioned to fit over the respective edge portions 160 and 162 of the bridge 26. Nuts 174 are employed to clamp plates 172 against the respective edge portions 160 and 162 to fix the bridge with respect to its trucks, and conversely, when it is desired to adjust the trucks 28 with respect to the bridge, the nuts 174 may be loosened to permit a sliding action of the trucks lengthwise of the bridge, after which the nuts are retightened to fix the trucks with respect to the bridge.

As previously indicated, the trucks 28 are arranged to permit adjustment of the bridge 26 to level same, and as indicated more particularly in FIGURE 9, the trucks 28 at each end thereof (while only one end of each truck is shown in FIGURES 1 and 9, the opposite ends of trucks are identical) have their rollers 30 journalled as at 180 at one end of a bar 182 which is in turn pivoted to the truck end portion as at 184. A screw type adjustment device 186 is employed to raise or lower the trucks with respect to the flange edges 32 on which the rollers ride, and the screw adjustment devices 186 each comprise a threaded member 188 provided with a handle 190, with the member 188 being threadedly received in a nut member 192 pivotally mounted in bracket 194, as by pin 196, which bracket 194 is secured in any suitable manner to the end 198 of the truck.

The bar 182 is formed as at 200 to define a bifurcated portion 201 including a pair of arms 202 that actually receive the respective rollers, and the screw member 188 bears against a block member 204 resting on a plate 206 that is fixed between the arms 202 (there being a universal joint connection of any appropriate type between the lower end of the threaded member 188 and the block 204).

The trolley 34 may take the form of any convenient structure appropriate to serve the purposes of this invention, and it may be driven longitudinally of the bridge 26 in any convenient manner, either manually, mechanically, electrically, or hydraulically. In the embodiment shown in FIGURE 1, the trolley is driven by an electric motor arrangement mounted in any suitable manner on the trolley 34 which is employed to actuate driving gears 144 through an appropriate coupling arrangement that may be of any conventional type.

The trolley also supports the welding wire reels 92 as well as the welding wire drive arrangement 95 that is shown in FIGURE 12, and which in the showing of FIGURE 1 is positioned within appropriate housing 210.

The reels 92 are separately mounted on a shaft 212 supported by a pedestal fixed to the top of trolley 34, the lower portion of which is indicated in phantom in FIGURE 11 at 214. Preferably, the mounting for the reels 92 includes an appropriate arrangement for electrically insulating them from the pedestal.

The welding wire drive structure described in connection with the showing of FIGURE 12 in the specific embodiment of FIGURE 1 is applied to housing structure 210, and, as indicated in FIGURE 1, the wires from the respective reels pass from the reels through a bushing 220 (formed of insulating material and mounted appropriately in the housing 210) and thence into engagement with the drive 95, which basically comprises for each wire a hardened steel roller 222 formed with a serrated or ridged driving edge surface 224, which engages the wire, with the wire being pressed against a resilient idler roller 226. The drive 95 includes a separate pair of rollers 222 and 226 for each welding wire, as indicated in FIGURE 12, and the rollers 226 are appropriately journalled in place in any suitable manner while the rollers 222 are keyed to shaft 228 that is mounted in appropriate bearings 230, and which is driven by a single electric motor of an appropriate type which actuates the shaft 228 through an appropriate coupling (not shown) to a shaft 232 and the cooperating sprockets 234 and 236 (that are keyed to the respective shafts 228 and 232) together with an appropriate interconnecting chain (not shown). Rollers 222 and 226 are appropriately insulated from the trolley in any suitable manner.

The respective welding wires 62 then pass through contacts 94 into the respective insulating tubes 96, and both of these elements extend to the respective welding heads in any appropriate manner, such as that suggested in FIGURE 1. In the arrangement shown, the tubes 96 emerge from out of the rear end of the housing structure 210 and extend over the top of the trolley 34 and thence downwardly to the respective welding heads. Appropriate support structures 240 may be employed to properly maintain the tubes 96 in place and as indicated, the support structures include supporting rollers 242 at their upper ends that are journalled for rotation about pins 244.

The welding current may be supplied to the machine 10 in any suitable manner, and FIGURE 1 shows diagrammatically a control board arrangement 250 that is fixed with respect to the trolley in any appropriate manner for controlling the welding operation as well as movement of the trolley 34 with respect to its bridge. The electrical system involved may be of any convenient type known to the art within the province of one skilled in the art.

The cantilever support member 36 comprises a tubular element 260 (see FIGURE 8) preferably formed from hot rolled commercial tubing and having one end thereof angled downwardly as at 262 (see FIGURES 1 and 11) and fixed to bracket plate 264 which is in turn fixed to the trolley 34 by appropriate bolts 266. Preferably the tubular member 260 is shaped so that when it is secured to the trolley 34, its outwardly extending portion 268 is horizontally disposed.

As indicated in FIGURE 8, the tubular element 260 is quadrilateral in transverse cross-sectional configuration, and it is oriented so that two of its opposing side walls 270 (see FIGURE 8) are vertically disposed while its other two opposing side walls 272 are horizontally disposed. Affixed to one of the side walls 270 as by plug welding, is an elongated plate 274 that preferably is a cold rolled steel element and that is proportioned with respect to the tubular element 260 to define upwardly and downwardly extending edge portions 276 and 278. The outer end of the tubular element 260 has affixed thereto a vertical plate 280 (see FIGURE 1) that serves as a stop for carriage 38.

Carriage 38 comprises a tubular element 282 that is received over the tubular support element 260. As indicated in FIGURE 8, the tubular element 282 is likewise quadrilateral in transverse cross-sectional configuration, but it is sufficiently larger in transverse cross-sectional configuration than the tubular element 260 to accommodate the supporting roller arrangement 287 indicated in FIGURE 8 that mounts the carriage 38 for floating movement along the cantilever support 36. Affixed across each end of carriage 38 as by welding are pairs of upper and lower bars 284 and 286.

The carriage 38 also carries at each end thereof vertically disposed bars 288 and 290 (see FIGURES 4 and 5), with the bars 288 and 290 being aligned with a plane that extends longitudinally of the support 36 and which is disposed vertically, as indicated in FIGURE 4 when machine 10 is mounted in its operative position. The bars 288 and 290 are fixed between the respective horizontally disposed bars 284 and 286 at each end of the carriage, as by welding.

The roller arrangement 287 comprises a pair of spaced roller devices 292 and 294 (see FIGURE 4) that ride on the upwardly directed edge surface 296 of the plate 274 edge portion 276 as well as a pair of roller devices 298 and 299 (see FIGURE 5) which engage the downwardly directed edge surface 300 of the plate 274 edge portion 278. As indicated in FIGURES 4, 5 and 8, these roller devices are mounted in their respective bars 288 and 290 at the upper and lower ends thereof, respectively.

At each end of the carriage 38 at the top thereof, similar roller devices 302 engage the side surface 304 of the plate 274 while similar roller devices 306 engage the outwardly facing side surface 308 of plate 274. The respective roller devices 302 and 306 are mounted in the carriage bars 284 at either end of the carriage. At the lower portion of the carriage, at both ends thereof, similar roller devices 302a and 306a are employed (see FIGURES 5 and 8), these roller devices being applied to the bars 286 at the ends of the carriage.

The special positioning of rollers 302 and 306 (as well as 302a and 306a) spaces their operating centers relatively close to each other and this introduces a marked stabilizing effect on carriage 38.

The roller devices 292, 298, 294, 302, 299, 306, 302a and 306a are substantially identical in construction, and as indicated in FIGURE 5A, they comprise a threaded stud 310 mounted in an appropriately formed bore 312 formed in one of the carriage components indicated with the stud carrying a ball bearing arrangement 314 comprising an inner race 316, an outer race 318 that forms the roller member of the roller assembly, and a plurality of bearing balls 320 operatively mounted between the two races in any conventional manner. Interposed between the inner race 316 and the carriage component to which the roller device is applied (bar 288 in the showing of FIGURE 5A) is a sleeve 322, and nuts 324 and 326 are applied to the stud 310 to draw the inner race against the sleeve 322 and sleeve 322 against the carriage component to operatively mount the roller device for engagement with the support 36. A set screw 328 is employed in connection with the roller devices 292, 298, 299, 306 and 306a to adjust the roller elements 318 for substantially perfect cooperation with the surfaces of the support 36 that the respective rollers are to engage.

The carriage 38 on the side thereof that is to be connected to the floating beam 40 has affixed thereto a pair of spaced outwardly extending plates 330 and 332 (see FIGURES 4 and 5) that are spaced apart to receive the floating member 40 and provide operating space for the roller arrangement 334 that provides the floating connection between the beam 40 and the carriage 38.

Bars or plates 330 and 332 have fixed across the upper and lower portions thereof that face the carriage 38 a pair of bars 336 and 338 that provide part of the mounting arrangement for the roller arrangement 334.

The floating member 40 has a structural configuration similar to the support member 36, and comprises (see FIGURE 4) a tubular element 341 (preferably formed from hot rolled commercial tubing) having a generally quadrilateral transverse cross-sectional configuration, to one side surface of which is fixed cold rolled steel plate 343 that extends longitudinally of the element 341 and is proportioned to define outwardly extending edge portions 345 and 347.

As indicated in FIGURE 4, the bar 336 of the carriage has mounted therein a pair of roller devices 340 and 342 which are arranged to position their roller elements 318 in engagement with the side edge surfaces 344 and 346 of the plate 343.

The plates 330 and 332 at the upper ends thereof also have mounted therein similar roller devices 350 and 352, which are positioned to bring their roller elements 318 into engagement with the side surfaces 354 and 356 of the plate 343.

At the underside of the trolley 38, the bar 338 is provided with a pair of roller devices 360 and 362, which are similar to the device shown in FIGURE 5A, and which are disposed to position their roller elements 318 in engagement with their respective plate edge surfaces 344 and 346.

Both the plates 330 and 332 at the underside of the carriage are provided with roller devices 350a and 352a (see FIGURE 1), which are positioned for engagement with the side surfaces 354 and 356 of the plate 343.

Generally speaking, where two roller devices are opposed in either of the arrangements 287 or 334, one of the roller devices should employ the set screw position adjusting arrangement of FIGURE 5A.

When the roller devices of the carriage are appropriately assembled and adjusted for engagement with the respective cooperating surfaces of the support 36 and beam 40, respectively, the beam 40 will have free vertical floating movement with respect to the carriage 38, and the carriage 38 will have free horizontal floating movement with respect to the support 36, such that the welding heads 48 and 46, guided by rollers 75 and 77, will freely follow the contouring presented by the stiffener 14 and beam web 20.

The lock device 99 (FIGURES 4 and 5) for securing the floating beam 40 to the carriage 38 comprises a plate 370 applied across the outwardly facing edges of the carriage plates 332 and 330 and having affixed thereto as by welding a housing 372 (FIGURES 4, 5 and 7) for a spring pressed plunger member 374 (FIGURE 7) comprising a head element 376 having affixed thereto a stem element 378 which extends outwardly of the housing 372 and is provided with a cross bar lock pin 380. A compression spring 382 interposed between the head 376 and the shoulder 384 of the housing 372 urges the head 376 toward the tubular element 341 of beam 40, the outwardly facing surface 386 of which has applied thereto an elongate threaded element 388. Element 388 may comprise a threaded rod which is divided in half for ease in affixing to the element 341 and the head is formed with a concave internally threaded surface 390 that cooperates with the threads of the element 388 to hold the beam 40 in suspended relation when spring 382 is allowed to bias the head against the threaded element 388.

The outwardly projecting end portion 392 of the housing 372 is provided with a pair of diametrically oppositely located slots 394 (see FIGURES 1 and 4) to receive the lock pin 380 in the locked position of the device 99, cross bar 395 serving as a handle for stem 378. Cross bar 395 avoids finger pinching problems that would be encountered if pin 380 were used as a handle.

The plate 370 is perforated as at 396 to accommodate the lock device at 376 (see FIGURE 7).

The locking device 100 for securing the carriage 38 against movement with respect to support 36 is similarly constituted and comprises a housing 372a affixed to tubular element 282 adjacent plate 330. The device 100 includes all of the elements shown in FIGURES 6 and 7, and its plunger head element 376 cooperates with threaded element 400 that is affixed to the outwardly facing side 402 of plate 274. Element 400 is similar to element 388 and is affixed in place by welding and extends along the desired path of movement of the carriage lengthwise of support 36.

FIGURES 15 and 16 illustrate a modified arrangement for supporting beam 40 in its raised position wherein the lock device 99 is eliminated in favor of a bail 401 pivotally secured at its ends 403 to bars 330 and 332 and having its bight portion 405 resting against surface 386 of the floating beam tubular element 341, which surface 386 has applied thereto a lug 407 formed with a camming surface 408 and a notched under portion 409 for camming the bail bight portion over lug 407 and catching it to support the floating beam, when the beam is moved to its raised position. To lower beam 40, one merely lifts the beam 40 enough to free the bail 401 from the lug 407 so that the bail can be swung outwardly of lug 407, after which the beam 40 may be readily lowered to its operative position.

As already indicated, the floating beam 40 at its lower end 42 is affixed to connector structure 50, the structural features of which are indicated in FIGURES 1 and 3. The connector structure 50 is of box-like construction comprising a top member 410, spaced depending side members 412 fixed to either side edge of the top member 410, and a bottom or lower member 414 that is fixed between the lower edge portions 416 of the respective side members 412 so as to span the space between them. The bottom member 414 is formed on either side thereof adjacent the respective side walls 412 with a slot 418 through which the component parts of connector device 56 protrude for the purpose of securing the welding head 48 to the connector structure 50.

Pivotal connection 52 of the welding head 46 comprises a pin 420 that is removably mounted in any suitable manner in the side walls 412.

The screw device 54 for actuating the welding head 46 to pivot same about pin 420 is supported by a downwardly inclined or angled portion 422 of the top plate 410, which is internally threaded as at 424 to threadedly receive screw member 426 provided with an appropriate handle portion 428 and a head portion 430 that engages the abutment surface 431 of the welding head 46. Threaded member 426 is swivelably secured to the head 430 by an appropriate ball and socket type universal joint arrangement generally indicated at 432, to allow the necessary pivoting movement between the head 430 and the screw member 426 as the welding head 46 is moved about pin 420 to close head 46 against the stiffener.

The welding heads 46 and 48 are secured to the connector structure 50 by clamp devices 440 and 442 (see FIGURE 2) cooperating with the respective suspension bars 444 and 446.

The clamp devices 440 and 442 are identical in construction and comprise bar members 448 and 450 that are drilled as at 452 and 454, respectively, to receive the lower ends of the respective suspension bars 444 and 446, respectively. The respective bars 448 and 450 are split axially of the respective bores 454 and 452 down to approximately the level of the bottoms 456 of the respective bores 452 and 454, and the resulting clamping portions that are so defined are drilled and tapped to receive appropriate screws 458 so that when the lower ends of the respective suspension bars 444 and 446 are received in the respective clamp devices 440 and 442, they may be clamped in place in the desired positions of adjustment longitudinally and rotationally of the suspension bars 444 and 446.

The suspension bar 444 of the welding head 48 has affixed to its upper end a flange plate 460 (see FIGURE 3), and the flange plate 460 is connected to a slide bar 462 that is mounted within connector structure 50 and on top of bottom plate 414, as by the spaced pairs of bolts 464 (only one pair is shown) extending through the respective slots 418, to secure the welding head 48 to the connector structure 50. Ordinarily, the bolts 464 and their respective nuts 466 will be operated to clamp the welding head to the connector structure 50 in a desired position of adjustment longitudinally of the slots 418, but by loosening the nuts 466, the welding head 48 may be adjusted longitudinally of such slots 418.

The suspension bar 446 of the welding head 46 has affixed to its upper end flange plate 470 which has affixed in turn to its upper surface a pivot structure 472 comprising a fabricated structure including plate 474 having welded to the top thereof a sleeve 476 (that receives pin 420) and a plate 478 that bears the abutment surface 431 against which the threaded member head 430 is to engage.

The plate 474 is drilled and tapped to receive appropriate bolts 480 that are in turn received through the flange plate 470 for the purpose of securing the welding head 46 to the pivot structure 472.

The housings 70 of the welding heads comprise (see FIGURE 2) hollow fabricated structures made up from sheets of a magnetic material, such as iron or mild steel to define the generally flat planar shape indicated in FIGURE 1 including the relatively wide and flat side surfaces 110 on either side thereof that are vertically disposed when the welding heads are mounted in their operative positions on the machine 10.

The side surfaces 110 are defined by relatively wide and flat side walls 489 that are separated by and affixed to each other as by welding edge pieces 490, 492 and 494 having the general configurations illustrated in FIGURE 2, and as already indicated, the edge pieces 490, 492 and 494 should be proportioned such that when the side surface 110 of the housing is positioned adjacent one of the beam end flanges 16 or 18, the tip 74 of the welding wire is disposed within an inch of the beam end flange. Thus, the housings should have a transverse dimension or thickness no greater than about two inches (assuming that the wire tips are centrally located in housing 70) and in an operating embodiment the outside transverse dimension does not exceed 1¼ inches. If the I-beam end flanges are to be contacted by clamp devices 440 and 442, the latter should not exceed two inches in width.

The edge walls 492 and 494 are spaced from each other to define a flux inlet opening 496 in which is secured by welding a tubular structure 498 that defines the respective chambers 80 of the welding heads. The tubular structures 498 pivotally mount within same butterfly valve members 500 that comprise the valve devices 88, and any appropriate arrangement may be employed for positioning and holding the butterfly valve members 500 in any desired position of adjustment to permit the desired flux flow through the welding heads, such as flat handles 501 (see FIGURE 1) that rest against pins 503 to dispose members 500 at a desired position of adjustment.

The upper ends of the tubular structures 498 are fixed as by welding to the lower ends of the clamping devices 440 and 442, respectively, and each tubular structure 498 includes a diagonally extending conduit member 502 to which flexible portions 87 and 85 of the respective flux conduits 84 and 83 are connected.

The edge plates 490 and 492 of housings 70 are respectively threaded to receive screw members 504 that make up the screw devices 76. The screw devices 76 further comprise appropriate handles 506 and heads 508 which bear against the respective bodies 64, and as in the case of the screw device 54, an appropriate type of ball and socket universal joint connection indicated at 510 is employed between the respective threaded members 504 and the heads 508.

The edge plate members 490 and 492 of housings 70 at the upper ends of the respective housings 70 are formed to define openings 512 through which the welding wire 62 and its associated components pass, and at the lower ends of the housings, the edge pieces 490 and 494 are spaced apart to define opening 82 and housing nozzle portion 513.

The bodies 64 of housings 70 are pivotally secured in place by appropriate pins that form pivots 72.

The rollers 75 and 77 may be of any conventional type journalled in place on the housings in any suitable manner substantially in the positions indicated in FIGURE 2, and are journalled to rotate about axes that are disposed substantially perpendicular to the weld wire tips of the respective heads.

It may be pointed out that in normal operation of apparatus 10, the welding heads 48 and 46 will be positioned sufficiently far along support member 36 outwardly of the bridge 26 to be disposed in advance of the truck wheels 30 so that the side surfaces 110 of housings 70 may be positioned flush with the inside surfaces of the beam end flanges 16 and 18.

The magnetic nature of housings 70 is a significant feature of the invention as the magnetic field developed by the welding current passing through the welding wires is concentrated in the welding head housings in circumambient relation about the respective welding wires and this is believed to hold the arc in centered relation against stray magnetic fields set up by the ground circuit and other arcs. Such stray magnetic fields are thought to be the cause of arc blow and this centering feature may make it possible to for the first time make tandem welds with two or more D.C. arcs.

The structural features of the flux hopper 86 (FIGURE 1) are diagrammatically illustrated in FIGURES 13 and 14 wherein it will be seen that the hopper 86 comprises a container 520 shaped to define a funneling portion 522 to which tubes 83 and 84 are connected in any suitable manner to supply welding flux to the respective tubes 83 and 84. Hopper 86 is mounted on top of carriage 38 by an appropriate bracket structure 524 that is fixed to each, as by welding.

Flux may be initially supplied to the hopper 520 through an appropriate inlet conduit 528 provided with a cap 530 that may be of the type that may be threaded onto the conduit 528 for the purpose of sealing off the opening of conduit 528.

As already indicated, an important aspect of our invention is that the hopper 86 is incorporated in a flux recovery system, the details of which are shown in FIGURES 13 and 14. The system further includes in the specific form illustrated an insert hopper structure 540 that is provided with a flange portion 542 adapted to rest on the top flange portion 543 of the hopper 86 for the purpose of mounting the insert structure 540 in operating position. The insert structure 540 further comprises a pair of downwardly inclined baffle portions 546 and 548 (FIGURE 14) that define a hopper funneling portion 550 terminating in a narrow elongated discharge opening 552 that opens into the hopper funneling portion 522 of hopper 86.

Mounted across the opening 552 is an appropriate form of closure device 554, which may be in the form of a hand operated pivotally mounted butterfly valve member 556 mounted on shaft 558 and positioned to close off the opening 552. Shaft 558 includes appropriate handle 559 (FIGURE 13) for moving valve member 556 between opened and closed positions.

Secured on top of the insert structure 540 is a cover member 560 that has secured thereacross a vertical imperforate baffle 562. An air discharge opening 564 is formed in the cover member 560 on one side of the baffle member, to which is connected an appropriate form of blower apparatus 566, which in the form illustrated comprises a blower 568 mounted on cover member 560 and operated by an appropriate type of an electric motor 570, to draw air from within insert structure 540 and discharge it through a cloth filter bag device 572.

The cover member 560 is formed in its top portion 574 on the other side of baffle 562 with an air flux intake opening 576 in which the discharge end 578 of flexible conduit 580 is mounted. The conduit 580 is sufficiently long to have its intake end 582 extend for easy application to the fillets 22 and 24 when apparatus 10 is positioned adjacent a stiffener 14, and an appropriate type of intake nozzle structure 584 is affixed to the end 582 of the conduit 580.

The cover member 560 also has affixed thereto a coarse mesh screen element 586 that extends entirely across the open area between baffle 562 and the air intake opening 576. Also, a fine mesh (100 mesh) screen 588 is similarly applied to cover 560 across the space between the baffle 562 and the air discharge opening 564.

During operation of apparatus 10, the flux in hopper funneling portion 522 discharges by gravity into tubes 83 and 84, with the flow being controlled by the setting of the valve devices 88.

After the welding has been completed, the valve devices 88 are shut off, valve member 556 moved to its closed position, and the flux recovery system operated to pick up unused flux remaining in the areas adjacent fillets 22 and 24. This is done by turning on motor 570 which operates blower 568 to remove air from within insert structure 540 and thus create vacuum conditions within the hopper, after which the nozzle structure 584 is applied to the localities of the fillets 22 and 24. The moving air flow through conduit 580 moves the flux through this conduit and into the cover 560 through which air and flux pass directly against the screen 586. The baffle 562 causes an air flow which involves an air flow movement underneath the lower edge 590 of baffle 562, through screen 588, and thence into blower 586 and out of filter 572.

The change of direction of the air flow around the lower edge 590 of the baffle member 562 results in the useable flux being dropped out of the air flow into the hopper portion 550 of hopper structure 540.

After all the flux has been drawn up into the insert structure 540, the valve device 554 is operated to permit the recovered flux to drop into hopper funneling portion 522.

The cover member 560 adjacent the screen 586 preferably includes a hingedly mounted door or panel member 592 provided with a suitable operating handle 594 and an appropriate locking device (not shown) for closing the door 592 to provide access to flux lumps or the like that collects on top of the screen 586.

*Distinguishing characteristics of the invention*

It will therefore be seen that we have provided a welding apparatus or machine that for the first time will permit a practical automatic welding operation to be applied to stiffeners for reinforcing fabricated I-beams. Our machine also includes a number of adjustability features that permit it to be readily applicable to the various sizes of such beams that may require stiffeners of the type indicated.

The dual welding head arrangement of our machine not only permits simultaneous welding in the area of the fillets 22 and 24, but also permits the welding heads to accurately follow the contours of the fillets, both horizontally and vertically, that will be encountered in practice because of irregularities in the stiffeners and in the I-beam webs and without changing the position of the welding head nozzles once they are set in their welding positions; this is because welding head unit 44 moves or adjusts as a unit under the action of the guiding rollers, and because the components of the welding head unit remain in fixed relation to each other during the welding operation. Furthermore, the positioning and relation of the welding head unit guide rollers brings the guiding action of the welding heads as close as feasible to the surfaces that should control the position of the heads relative to the fillets.

Furthermore, the welding heads are adjustable to accommodate varying stiffener thicknesses and to independently position the respective welding wire tips with respect to the fillets that are to be welded.

The adjustable connection of the bridge with respect to its trucks permits the trucks to be adjusted with respect to the bridge to accommodate I-beams of different web widths, beam widths of 42 inches to 96 inches being accommodated by the illustrated embodiment. Furthermore, the bridge truck wheels are adjustable to accommodate unequal flange heights, and in the illustrated embodiment, flange differences of up to 8 inches may be readily accommodated (in order to level the bridge for efficient operation of the dual welding head arrangement).

As previously indicated, one of the major difficulties encountered with prior welding arrangements for automatically welding stiffeners 14 in place has been in coming within a reasonable distance of the flanges with the weld. Our apparatus or machine can start the fillet welds involved and finish same within one inch of the respective beam end flanges. A complete weld can be finished by tack welding the stiffeners to the beam web at the flange ends.

The bridge drive of the illustrated machine is arranged to move the trolley 34 such that the welding heads will move transversely of the beam at a rate on the order of 50 inches per minute. The exact rate of trolley travel will be dependent upon the flat up, the size of the fillet desired, and the amount of amperage involved in the welding operation.

The welding wire feed includes a single drive motor which controls the feed of both welding wires, and preferably this motor is provided with an independent power supply.

The flux recovery system disclosed will retrieve and return to the flux hopper substantially all of the flux that is left over after the welding operation that could be reused if recovered. This must be considered quite significant since only about one-fourth of the flux applied to the fillet is melted by the welding operation, and most of the rest is reusable. The flux supplied to the heads is accurately fed to the weld being made, and the flux flow is adjustable to the amount needed.

The precise guidance provided by our machine allows any size fillet weld from $3/16$ inch to $5/16$ inch to be made, regardless of the buckles in the stiffener or web or the squareness of the stiffener with respect to the beam end flanges. In contrast to this, most fabricators of I-beams find it difficult to make the stiffener fillet welds as small as $3/16$ of an inch consistently, even though this is a size frequently specified and paid for.

While the machine as disclosed is a dual welding head arrangement, either or both heads may be employed for welding purposes at any one time although both welding heads will remain physically associated with a machine.

The machine 10 can be easily moved along an I-beam when mounted on its end flanges substantially in the manner shown in FIGURE 1 by one man, and can be conveniently crane lifted between I-beams in any suitable manner.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A device for simultaneously fillet welding to a plate both sides of a stiffener or the like that is disposed at right angles to the plate, said device comprising:
   a dual welding head unit including a pair of welding heads, each of said heads including a nozzle adapted to receive a welding wire, means for positioning said heads in operative fillet welding position on either side of the stiffener with the respective nozzles disposed to direct the welding wires toward the respective fillets on either side of said stiffener that are defined by placing one edge of the stiffener against the plate,
   means for fixing said heads with respect to each other in their said welding positions,
   roller means carried by one of said heads and engaging the plate adjacent one of the fillets for supporting said heads on the plate for movement longitudinally of the plate when said heads are disposed in in their welding positions,
   roller means carried by each of said heads and engaging the respective sides of the stiffener adjacent the fillets when said heads are disposed in their welding positions,
   and means operably mounting said head unit for movement longitudinally of the stiffener,
   said mounting means comprising:
      drive means for moving said head unit longitudinally of the stiffener,
      and a motion transmitting connection between said drive means and said head unit for translating the motive force provided by said drive means into movement of said heads longitudinally of the stiffener,
      said motion transmitting connection including means for mounting said head unit for free floating movement laterally of said stiffener, and plate, respectively,
      whereby said head unit follows the contours of said plate and stiffener when moved longitudinally thereof and said heads remain in their said welding positions with respect to each other as said head unit follows said contours.

2. A device for welding both sides of a stiffener or the like to a plate by welding at the fillets formed on either side of the stiffener by disposing one edge of the stiffener against the plate, said device comprising:
   a dual welding head unit including a pair of welding heads each of said heads including a nozzle adapted to receive a welding wire and formed to define a feed path therefor means for feeding the respective welding wires to the respective heads,
   means for positioning said heads in operative fillet welding position on either side of the stiffener with the respective nozzles disposed to direct their welding wires toward the respective fillets on either side of said stiffener and with said heads aligned in coplanar relation in a plane extending transversely of the stiffener,
   means for adjusting the respective nozzles with respect to said heads for adjusting the positioning of the respective wires with respect to the respective fillet apexes,
   means for fixing said heads with respect to each other in their said welding positions,
   roller means carried by one of said heads below the nozzle and adapted to engage the plate adjacent one of the fillets for supporting said heads on the plate for movement longitudinally of the plate when said heads are disposed in their welding positions,
   roller means carried by each of said heads above the nozzle thereof and adapted to engage the respective sides of the stiffener adjacent the fillets when said heads are disposed in their welding positions,
   said roller means of each head being respectively rotatable about axes lying in said plane and disposed substantially normally of the respective welding wire feed paths,
   and means operably mounting said head unit for movement longitudinally of the stiffener,
   said mounting means comprising:
      drive means for moving said head unit longitudinally of the stiffener,
      and a motion transmitting connection between said drive means and said head unit for translating the motive force provided by said drive means into movement of said heads longitudinally of the stiffener,
      said motion transmitting connection including means for mounting said head unit for free floating movement laterally of said stiffener and plate, respectively, whereby said head unit follows the contours of plate and stiffener when moved longitudinally thereof and said heads remain in their said welding positions with respect to each other as said head unit follows said contours, and means operably associated with said feeding means for supplying welding current to said wires.

3. In welding apparatus for fillet welding stiffeners to the webs of fabricated I-beams or the like and between the end flanges thereof, said apparatus comprising:

a pair of trucks adapted to ride on the respective end flanges of the I-beam when said beam is positioned to vertically dispose the beam flanges, a bridge carried by and extending between said trucks, a trolley mounted on said bridge for movement longitudinally of said bridge, means for driving said trolley to move longitudinally of said bridge, a pair of welding heads secured to said trolley, each of said heads including a welding wire, means for feeding the respective welding wires to the respective heads, means for positioning said heads in operative welding position on either side of a stiffener to be applied to the I-beam web with the welding wires directed toward the respective fillets on either side of said stiffener that are defined by placing one edge of the stiffener against the web, means for fixing said heads with respect to each other in their said welding positions, roller means carried by one of said heads for engaging the beam web adjacent one of the stiffener defined fillets for supporting said heads on the beam for movement longitudinally of the stiffener, roller means carried by each of said heads for engaging the respective sides of the stiffener adjacent the fillet when said heads are disposed in their said welding positions, and a motion transmitting connection between said trolley and said heads for translating the motive force provided by said drive means into movement of said heads longitudinally of the stiffener, said motion transmitting connection including means for connecting said heads to the trolley for free floating movement laterally of, and parallel to the plane of, said stiffener, whereby said heads follow the contours of said web and stiffener when moved longitudinally thereof.

4. The apparatus set forth in claim 3 wherein said connecting means of said motion transmitting connection includes:

a support member secured to said trolley and extending generally normally of said bridge, said support member having a portion projecting outwardly of said trolley that is positioned to be substantially horizontally disposed when said trucks are operably mounted on the beam end flanges, a carriage carried by said support member portion, means for mounting said carriage on said support member portion for free floating movement longitudinally of said support member portion, an elongate member secured to said carriage, said elongate member being positioned to be substantially vertically disposed when said trucks are operably mounted on said beam end flanges, and means for connecting said elongate member to said carriage for free floating movement longitudinally of said elongate member, and wherein said heads are secured to said elongate member.

5. The apparatus set forth in claim 4 wherein:

one of said heads is secured to said elongate member for swinging movement toward and away from the other head, and including means for selectively swinging said one head toward and away from said other head and for securing said one head in its said operative welding position.

6. The apparatus set forth in claim 5, including:

means for releasably mounting said one head for adjusting movement toward and away from the other of said heads to accommodate stiffeners of different thicknesses.

7. The apparatus set forth in claim 4 including:

a flux hopper carried by said carriage, conduit means extending between said hopper and the respective heads for supplying flux to the welding wire tips and disposed to provide gravity flow between said hopper and the respective heads, said conduit means being formed at their respective discharge ends to receive the respective wire tips centrally thereof, and vacuum system means carried by said hopper for retrieving excess flux from the fillets after the fillet welding is complete and returning it to said hopper.

8. The apparatus set forth in claim 4 wherein:

said heads are planar in configuration and are disposed in planes parallel to the plane that includes said elongate member and extends transversely of said bridge.

9. The apparatus set forth in claim 4 wherein:

said bridge includes a bail structure fixed to the ends thereof for crane lifting said apparatus as a unit between I-beams.

10. The apparatus set forth in claim 4 wherein said trolley carries reel means for supplying the respective welding wires, and wherein said means for feeding said welding wires comprises:

a drive shaft operably mounted on said trolley, motor means for driving said drive shaft, separate drive means coupled to the respective welding wires for feeding them longitudinally thereof toward said heads, and means for coupling said separate drive means to said drive shaft.

11. The apparatus set forth in claim 4 wherein:

said heads are proportioned to dispose the welding wire tip within one inch of the beam end flanges when the heads are disposed in abutting relation to the respective end flanges adjacent one end of a stiffener.

12. The apparatus set forth in claim 4 wherein said support portion comprises:

a tubular element having a quadrilateral transverse cross-sectional configuration, a plate element affixed to one side of said tubular element and extending parallel thereto, with the side edges of said plate element projecting outwardly of said tubular element, said plate element being disposed in a vertical plane, and wherein said elongate member comprises:

a tubular element having a quadrilateral transverse cross-sectional configuration, a plate element affixed to one side of said elongate member tubular element and extending parallel thereto, with the side edges of said elongate member plate element projecting outwardly of said tubular element, and wherein said means for connecting said elongate member to said carriage comprises roller means journalled on said carriage and engages the side and edge portions of said support portion and elongate member plate elements.

13. The apparatus set forth in claim 12 including:
means for releasably securing said elongate member at selected positions of adjustment with respect to said carriage,
and means for releasably securing said carriage at selected positions of adjustment with respect to said support portion.

14. In welding apparatus for fillet welding stiffeners to the webs of fabricated I-beams or the like and between the end flanges thereof, said apparatus comprising:
a bridge adapted to ride on the upturned end flanges of the beam when the beam is positioned to vertically dispose its end flanges,
a trolley mounted on said bridge for movement longitudinally thereof,
means for moving said trolley longitudinally of said bridge,
a cantilever support secured to said trolley and positioned to be horizontally disposed when the bridge is riding on the beam end flanges,
a vertically disposed elongate member secured to said support at one side of the bridge,
means for connecting said elongate member to said support for horizontal and vertical free floating movement,
a pair of welding heads secured to the lower end of said elongate member,
said heads being oriented for fillet welding application,
means for positioning said heads in operative fillet welding position on either side of a stiffener to be applied to the beam web, with said heads being oriented for fillet welding application toward the respective fillets on either side of the stiffener, that are defined by placing one edge of the stiffener against the web,
means for fixing said heads with respect to each other in their said welding positions,
roller means carried by one of said heads for engaging the beam web adjacent one of the stiffener defined fillets for supporting said heads and said elongate member on the beam for movement longitudinally of the stiffener under the action of said moving means,
and roller means carried by the respective heads for engaging the respective sides of the stiffener adjacent the fillets when said heads are disposed in their said welding positions.

15. The apparatus set forth in claim 14 including:
lock means for supporting said elongate member in a raised inoperative position,
said lock means comprising:
a bail member carried by said cantilever support in depending relation,
and an under-cut lug affixed to said elongate member and positioned to snag on said bail member.

16. A device for simultaneously fillet welding to a plate both sides of a second plate that is disposed at right angles to the first plate, said device comprising:
a dual welding head unit including a pair of welding heads,
each of said heads including a nozzle adapted to receive a welding wire and formed to define a feed path therefor,
means for positioning said heads in operative fillet welding position on either side of the second plate with the respective nozzles disposed to direct the welding wires toward the respective fillets on either side of the second plate that are defined by placing one edge of the second plate against the first plate, and with said heads aligned in coplanar relation in a plane extending transversely of the second plate,
means for fixing said heads with respect to each other in their said welding positions,
a roller means carried by one of said heads and engaging the first plate adjacent one of the fillets for supporting said head unit on the first plate for movement longitudinally of the plate when said heads are disposed in their said welding positions,
roller means carried by each of said heads and engaging the respective sides of the second plate adjacent the fillets when said heads are disposed in their said welding positions,
said roller means of each head being respectively rotatable about axes lying in said plane and disposed substantially normally of the respective welding wire feed paths,
and means operably mounting said head unit for movement longitudinally of the second plate,
said mounting means comprising:
drive means for moving said head unit longitudinally of the second plate,
and a motion transmitting connection between said drive means and said head unit for translating the motive force provided by said drive means into movement of said heads longitudinally of the second plate,
said motion transmitting connection including means for mounting said head unit for free floating movement laterally of said first and second plates, respectively,
whereby said head unit follows the contours of said plates when moved longitudinally of said second plate and said heads remain in their said welding positions with respect to each other as said head unit follows said contours,
said nozzles each being mounted within their respective heads for independent adjusting movement laterally of the direction of movement of said head unit under the action of said drive means.

17. The device set forth in claim 16 wherein:
said roller means each comprises a roller having a substantially cylindrical roller bearing surface terminating in abrupt side edges,
whereby said rollers ride on side edges thereof for firm contact with the surfaces they engage.

18. In welding apparatus for fillet welding on a beam or the like, said apparatus comprising:
a bridge,
means for mounting the bridge to move longitudinally of the beam,
a trolley mounted on said bridge for movement longitudinally of said bridge when said bridge is mounted for movement longitudinally of the beam,
means for moving said trolley longitudinally of said bridge,
a cantilever support secured to said trolley and positioned to be horizontally disposed when the bridge is mounted for said movement longitudinally of the beam,
a dual welding head unit carried by said support,
said head unit including a pair of welding heads oriented for fillet welding application,
each of said heads including a nozzle adapted to receive a welding wire and forming a feed path therefor,
means for positioning said heads in operative fillet welding position to plate means to be fillet welded to the beam, with said nozzles being respectively oriented for fillet welding application toward the respective fillets of the plate means to be welded, and with said heads substantially aligned in coplanar relation in a plane extending transversely of the plate means,
means for fixing said heads with respect to each other in their said welding positions,
roller means carried by one of said heads for engaging the beam adjacent one of the fillets for supporting said heads on the beam for movement longitudinally of the plate means under the action of said moving means, roller means carried by the respective heads for engaging the respective sides of the plate means adjacent the respective fillets when said heads are disposed in their said welding positions,
said roller means of each head being respectively rotatable about axes lying in said plane and disposed substantially normally of the respective welding wire feed paths,
and means operably mounting said head unit on said support for movement longitudinally of the plate means,
said mounting means comprising:
  a motion transmitting connection between said support and said head unit for translating the motive force provided by said moving means into movement of said heads longitudinally of the plate means,
  said motion transmitting connection including means for mounting said head unit for free floating movement laterally of the plate means, and beam, respectively,
  whereby said head unit follows the contours of the beam and plate means when moved longitudinally of the plate means and said heads remain in their said welding positions with respect to each other as said head unit follows said contours,
said nozzles each being mounted within their respective heads for independent adjusting movement laterally of the direction of movement of said head unit under the action of said moving means.

References Cited
UNITED STATES PATENTS

| | | | |
|---|---|---|---|
| 1,560,699 | 11/1925 | Kramer | 219—125 |
| 2,025,785 | 12/1935 | Southgate | 219—125 |
| 2,390,560 | 12/1945 | Stanley | 219—130 |
| 2,690,493 | 9/1954 | Schaefer | 219—130 |
| 2,836,704 | 5/1958 | Mason | 219—125 |
| 2,911,517 | 11/1959 | Armstrong | 219—125 |
| 3,072,779 | 1/1963 | Masters | 219—125 |

JOSEPH V. TRUHE, *Primary Examiner.*